United States Patent
Lee

(10) Patent No.: US 10,045,190 B2
(45) Date of Patent: Aug. 7, 2018

(54) BLUETOOTH DEVICE AND METHOD FOR PROVIDING AND OBTAINING BLUETOOTH DEVICE INFORMATION

(71) Applicant: Samsung Electronics Co., Ltd., Gyeonggi-do (KR)

(72) Inventor: Jae-Hyeok Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 224 days.

(21) Appl. No.: 14/108,515

(22) Filed: Dec. 17, 2013

(65) Prior Publication Data

US 2014/0206290 A1    Jul. 24, 2014

(30) Foreign Application Priority Data

Jan. 22, 2013  (KR) .................. 10-2013-0006806

(51) Int. Cl.
  *H04W 4/80*   (2018.01)
  *H04W 8/00*   (2009.01)
  *H04W 84/18*  (2009.01)

(52) U.S. Cl.
  CPC ............ *H04W 8/005* (2013.01); *H04W 4/80* (2018.02); *H04W 84/18* (2013.01)

(58) Field of Classification Search
  None
  See application file for complete search history.

(56) References Cited

U.S. PATENT DOCUMENTS

| | | | |
|---|---|---|---|
| 2005/0267900 A1* | 12/2005 | Ahmed | .................. G06Q 10/10 |
| 2006/0173974 A1* | 8/2006 | Tang | ............................ 709/217 |
| 2012/0289157 A1* | 11/2012 | Palin | ...................... H04W 8/24 455/41.2 |
| 2013/0311610 A1* | 11/2013 | Kim | .................... H04L 12/2818 709/217 |
| 2014/0134947 A1* | 5/2014 | Stouder-Studenmund | .. 455/41.2 |

* cited by examiner

*Primary Examiner* — Alejandro Rivero
(74) *Attorney, Agent, or Firm* — Cha & Reiter, LLC.

(57) ABSTRACT

A method for providing information associated with a target Bluetooth device. A first, search-attempting Bluetooth device sends an inquiry message for searching for a nearby target Bluetooth device. A target Bluetooth device responds by sending an inquiry response message including predefined information mark data. The first Bluetooth device extracts link information from the information mark data, and uses the link information to access information associated with the target Bluetooth device. If the link information includes a user manual link or an application link, after the first Bluetooth device and the target Bluetooth device are paired, the manual link or the application link are used for obtaining a manual associated with the target Bluetooth device or downloading an application associated with the target Bluetooth device.

9 Claims, 7 Drawing Sheets

BLUETOOTH DEVICE AND METHOD FOR PROVIDING AND OBTAINING BLUETOOTH DEVICE INFORMATION

CLAIM OF PRIORITY

This application claims priority under 35 U.S.C. § 119(a) to a Korean Patent Application filed in the Korean Intellectual Property Office on Jan. 22, 2013 and assigned Serial No. 10-2013-0006806, the entire disclosure of which is hereby incorporated by reference.

BACKGROUND

Technical Field

The present disclosure relates generally to Bluetooth-capable devices and methods of information transfer between such devices.

Description of the Related Art

Bluetooth technology provides a scheme for enabling communication devices to perform wireless communication without using cables and wires in a short range. Bluetooth technology uses a 2.4 GHz Industrial Scientific Medical (ISM) radio band which does not require a license for use. A Bluetooth system supports one-to-one and one-to-multiple connections between Bluetooth devices having a Bluetooth function.

Bluetooth technology is used to connect a printer, a keyboard, or a mouse to a Personal Computer (PC) such as a laptop computer or a desktop computer without a cable. Bluetooth technology is also used in data transmission between various mobile terminals such as a Personal Digital Assistant (PDA), a mobile phone, a smart phone, a tablet computer, and a laptop computer. This technology is also used to wirelessly connect a headset, an earphone, or a speaker to a mobile terminal.

For communication between Bluetooth devices, pairing needs to be performed. In order for one Bluetooth device to be paired with another Bluetooth device, one of the Bluetooth devices performs an inquiry process for searching for nearby Bluetooth devices. The Bluetooth device which searches for nearby Bluetooth devices according to the inquiry process is considered a master device, and the Bluetooth device which responds to the search of the master device is considered a slave device.

The master device transmits an inquiry message for searching for the nearby Bluetooth devices. A slave device nearby the master device, upon receiving an inquiry message, sends an inquiry response message to the master device. The inquiry response message includes a Bluetooth device address of the slave device. The master device, upon receiving the inquiry response message, sends a remote name request message for requesting a remote name of the slave device to the slave device. The remote name is a name of the Bluetooth device, for example, a model name of the Bluetooth device. The slave device, upon receiving the remote name request message, sends a remote name response message including its remote name to the master device.

The master device, upon discovering one or more nearby Bluetooth devices according to the inquiry process, displays a Bluetooth device list showing names of the discovered one or more nearby Bluetooth devices through a display. Thus, a user may recognize Bluetooth devices which may be paired from the Bluetooth device list. If the user selects a Bluetooth device with which the user desires pairing from among the Bluetooth devices of the Bluetooth device list, then the master device sends a pairing request to the Bluetooth device selected by the user. Thus, pairing between the master device and the Bluetooth device selected by the user may be performed.

Meanwhile, a Bluetooth function varies from profile to profile, but generally, Bluetooth device users have a difficulty in fully knowing Bluetooth functions. Moreover, Bluetooth devices, even though having the same Bluetooth function, have different usages, such that users often have some problems in using them. In particular, to use devices having Bluetooth functions, such as a headset, a television (TV), and a car-kit, separate dedicated applications are required or the usages of such devices may be complicated.

Thus, for example, when a user desires to pair a Bluetooth device to a mobile terminal and learn how to use the Bluetooth device, he needs to obtain the necessary information for doing so. To this end, the user may search the Internet for a user's manual for that Bluetooth device and then download the manual, or download an application program ("app") found on the Internet or in an 'app market' or 'app store'. Typically, the app market or the app store is managed by a common carrier or a mobile terminal manufacturer.

As such, to use a Bluetooth device properly, the user encounters the inconvenience of searching for information associated with the Bluetooth device. Furthermore, some users may not easily recognize which application for a desired Bluetooth device needs to be downloaded, despite reading an instruction manual for that device.

SUMMARY

Aspects of the present disclosure provide a method by which a user is conveniently and automatically provided with information associated with a target Bluetooth device. Such information may include a user's manual or a downloaded application associated with the target Bluetooth device.

According to an aspect of the present disclosure, there is provided a method performed in a first Bluetooth device, for providing information associated with a target Bluetooth device. An inquiry message is sent for searching for a nearby target Bluetooth device. An inquiry response message is received from a target Bluetooth device, including predefined information mark data. Link information is extracted from the information mark data, and associated information of the target Bluetooth device is accessed using the extracted link information.

The associated information of the target Bluetooth device may be a user manual and/or an application useful or necessary for communicating with the target Bluetooth device. That is, the link information may contain a link to easily obtain the manual and/or a link to download the application. In some embodiments, the application can be automatically downloaded, without the need for the user making a selection to download it.

In a method performed in a target Bluetooth device, an inquiry message is received from a first Bluetooth device. A responsive inquiry response message is sent to the first Bluetooth device, the inquiry response message comprising predefined information mark data. The information mark data comprises link information for accessing associated information of the target Bluetooth device. An exemplary target Bluetooth device for performing the method is disclosed.

According to another aspect of the present disclosure, there is provided a Bluetooth device (first Bluetooth device)

including a Bluetooth unit for performing Bluetooth communication with another Bluetooth device. A controller coupled to the Bluetooth unit sends an inquiry message for searching for a nearby target Bluetooth device. The controller extracts, from a received inquiry response message, predefined information mark data and link information contained within the information mark data. The controller uses the link information to access associated information of the target Bluetooth device.

BRIEF DESCRIPTION OF THE DRAWINGS

The above and other features and advantages of embodiments of the present disclosure will be more apparent from the following detailed description taken in conjunction with the accompanying drawings, in which.

DETAILED DESCRIPTION

Figure 1:
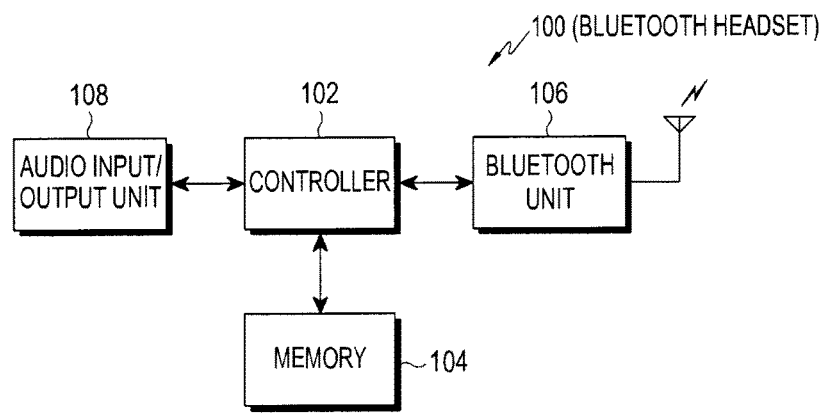
FIG. 1 is a block diagram illustrating a Bluetooth headset according to an embodiment of the present disclosure.

Hereinafter, embodiments of the present disclosure will be described in detail with reference to the accompanying drawings. In the drawings, like reference numerals refer to like components. The following description using reference numerals in the annexed drawings is intended to facilitate comprehensive understanding of the embodiments of the present disclosure as defined in the claims and equivalents thereof.

To help understanding of the embodiments of the present disclosure, various specific details are included, but they should be regarded as being illustrative. Therefore, those of ordinary skill in the art may recognize that various changes and modifications of the embodiments described below may be made without departing the scope and spirit of the present disclosure. Moreover, description of well-known functions or components may be omitted for clarity and brevity.

The terms and words used in the following description and claims are not limited to the bibliographical meanings, but, are merely used by the inventor to enable a clear and consistent understanding of the disclosure. Accordingly, definitions of the terms and words should be made based on all the details of the specification.

Hereinafter, a description will be made of embodiments of the present disclosure in which the present disclosure is applied to a Bluetooth mobile terminal and a Bluetooth headset. The Bluetooth mobile terminal refers to a mobile terminal having a Bluetooth function, and the Bluetooth headset refers to a headset having a Bluetooth function. In addition, a description will be made of embodiments of the present disclosure in which the Bluetooth mobile terminal is a search-attempting Bluetooth device (also referred to as a "first Bluetooth device") and the Bluetooth headset is a target Bluetooth device. However, these are merely examples to facilitate explanation of the presently disclosed technology. It is understood that other embodiments are available. Moreover, the embodiments of the present disclosure may be applied to other devices by those of ordinary skill in the art through some modifications which do not depart from the scope of the present disclosure. For instance, a desktop computer can be an alternative search-attempting device. Other target devices include a wireless speaker or a wireless earphone, and any other Bluetooth-capable device.

FIG. 1 is a block diagram illustrating a Bluetooth headset, 100, which is an example of a target Bluetooth device ("target electronic device") according to an embodiment of the present disclosure. The Bluetooth headset 100 transmits and receives audio data with a first Bluetooth device such as a Bluetooth mobile terminal 600 of FIG. 6. The Bluetooth headset 100 may receive audio data from the Bluetooth mobile terminal 600 through Bluetooth communication to output audio corresponding to the received audio data through a speaker, and may transmit audio data corresponding to audio input from a microphone to the Bluetooth mobile terminal 600 through Bluetooth communication.

As shown in FIG. 1, the Bluetooth headset 100 includes a controller 102, a memory 104, a Bluetooth unit 106, and an audio input/output unit 108. The memory 104 stores a program for operations of the controller 102 and stores various data according to the operations of the controller 102. The Bluetooth unit 106 performs Bluetooth communication with another Bluetooth device. The audio input/output unit 108 includes an audio output device such as a speaker and an audio input device such as a microphone. The audio input/output unit 108 transmits audio data corresponding to audio input through the microphone to another Bluetooth device, and outputs audio corresponding to the audio data received from another Bluetooth device through the speaker.

Upon receiving an inquiry message from another Bluetooth device through the Bluetooth unit 106, the controller 102 sends an inquiry response message including predefined information mark data to a search-attempting Bluetooth device through the Bluetooth unit 106. In the present disclosure, for example, the Bluetooth mobile terminal 600, which is a master device that sends the inquiry message, is the search-attempting Bluetooth device. Thereafter, if receiving a pairing request message from the Bluetooth mobile terminal 600 through the Bluetooth unit 106, the controller 102 performs pairing with the Bluetooth mobile terminal 600 through the Bluetooth unit 106.

The controller 102 includes link information of the Bluetooth headset 100 in the information mark data. The link information contains a link to obtain associated information of the Bluetooth headset 100. For instance, the link can be a web address of a web page containing the associated information. The associated information may be any one or both of user manual information of the Bluetooth headset 100 and information regarding an application associated with the Bluetooth headset 100. The manual information includes a manual link, i.e., a link on a network that provides the manual. If the associated information includes the information regarding the application associated with the Bluetooth headset 100, the link information includes an application link. The application link means a link on the network, which provides that application.

The following description will use an example in which the associated information includes both the manual information and the application information associated with the Bluetooth headset 100, and the link information includes the manual link and the application link. However, the associated information may also include other information if other information is necessary, useful or desirable to the user. In practice, according to needs, the link information may be designed to include either the manual link or the application link.

The controller 102 includes the information mark data in the inquiry response message by using an Extended Inquiry Response (EIR) of the inquiry response message. The EIR is included in the inquiry response message according to Bluetooth standards.

Figure 2:
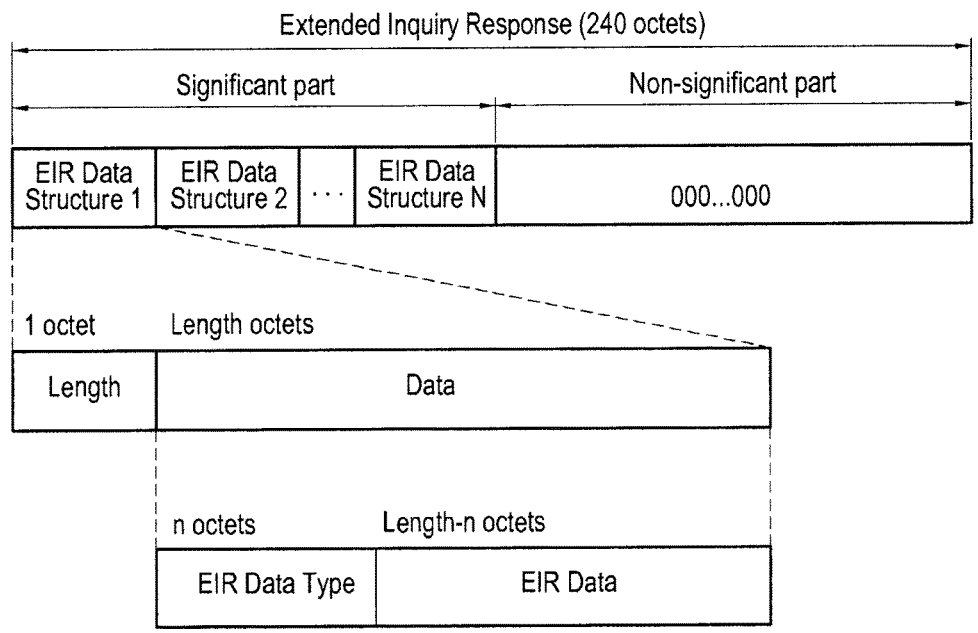
FIG. 2 is a diagram illustrating an Extended Inquiry Response (EIR) data format according to the Bluetooth specification.

FIG. 2 is a diagram illustrating an EIR data format according to the Bluetooth specification. The EIR data format of FIG. 2 is disclosed in the Bluetooth specification, for example, "Figure 8.1 Extended Inquiry Response data format" in Part C, Generic Access Profile, of core version 4.0 [Vol 3]. As shown in FIG. 2, an EIR frame (hereafter, also called "an EIR") has a length of 240 octets and may include multiple EIR data structures, each of which includes a length field with a value indicating a length of the corresponding EIR data structure, and a data field including data. The data field includes an EIR data type field and an EIR data field. A part including the EIR data structures is considered a "significant part" and the other part is considered a "non-significant part".

According to the Bluetooth specification, EIR data types included in the EIR include service class Universally Unique Identifiers (UUIDs), a local name, manufacturer specific data, and so forth. A manufacturer of a Bluetooth device may include and use data of 2 octets or more as manufacturer specific data in EIR data. The Bluetooth specification stipulates that a value indicating a type of the manufacturer specific data is '0xFF' and the first 2 octets of the manufacturer specific data includes a company identifier code for identifying the manufacturer.

Figure 3:
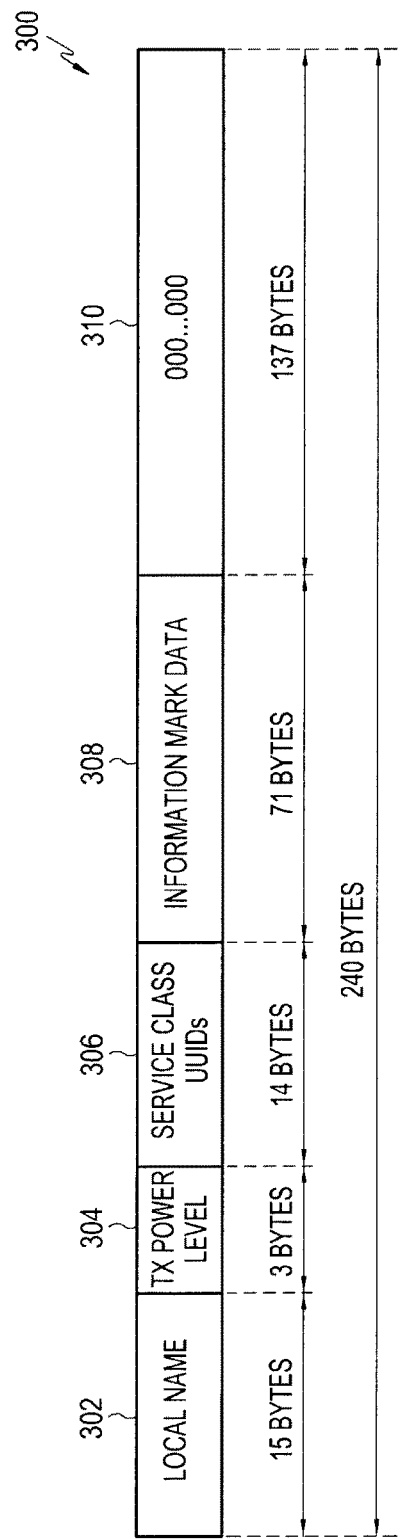
FIG. 3 is a diagram illustrating an example of an EIR according to an embodiment of the present disclosure.

FIG. 3 is a diagram illustrating an example of an EIR frame ("EIR"), 300, according to an embodiment of the present disclosure, which has a structure based on the EIR data format of FIG. 2. EIR 300 includes a local name 302, a transmit power level 304, service class UUIDs 306, and information mark data 308. A part including the local name 302, the transmit power level 304, the service class UUIDs 306, and the PAM data 308 corresponds to a significant part of FIG. 2, and a part 310 corresponds to a non-significant part of FIG. 2. For example, the local name 302, the transmit power level 304, the service class UUIDs 306, and the information mark data 308 are each a respective EIR data structure, and have sizes of 15 bytes, 3 bytes, 14 bytes, and 71 bytes, respectively. Thus, in the example, among the total size of 240 bytes (octets), 103 bytes form a significant part and 137 bytes form the non-significant part 310. The information mark data 308 may be configured as shown in FIG. 4.

Figure 4:
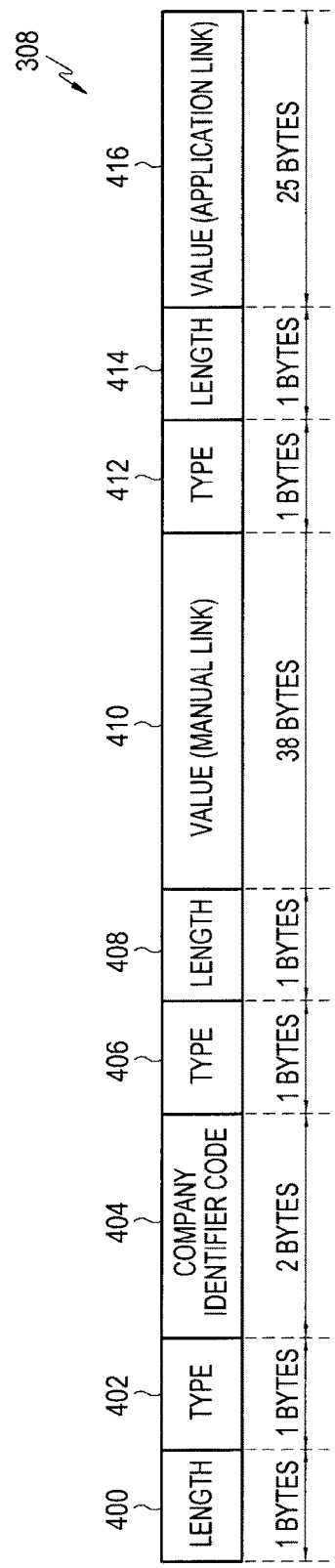
FIG. 4 is a diagram illustrating a structure of information mark data according to an embodiment of the present disclosure.

FIG. 4 is a diagram illustrating a structure of the information mark data 308 according to an embodiment of the present disclosure, in which as described above, the information mark data 308 includes the manual link and the application link. As shown in FIG. 4, the information mark data 308 has a size of 71 bytes and includes successive 1-byte length field 400, 1-byte type field 402, 2-byte company identifier code field 404, 1-byte type field 406, 1-byte length field 408, 38-byte value field 410, 1-byte type field 412, 1-byte length field 414, and 25-byte value field 416. The value fields 410 and 416 include the manual link and the application link, respectively. That is, the value field 410 has a value indicating the manual link and the value field 416 has a value indicating the application link.

The length field 400 has a value (e.g., "70" bytes) indicating the entire data size following the length field 400. The type field 402 has a value such as "0xFF" indicating that a type of the information mark data 308 is manufacturer specific data. The company identifier code 404 has a company identifier code value assigned to a manufacturer of a Bluetooth device according to an embodiment of the present disclosure. The type field 406 has a value indicating the type of data in data field 410. A certain value, e.g., "0x01" indicates that this data type is manual link data.- The length field 408 has a value such as "38" indicating a size of the value field 410 following the length field 408. The value indicating the manual link of the value field 410 represents the alphanumeric sequence of a link such as 'http://www-.sec.com/manual/UN46D6900WFH'. The type field 412 has a value (e.g., "0x02") indicating the data type of the value field 416, where the value field 416 represents a value indicating the application link. The length field 414 has a value indicating a data size (e.g., "25" bytes) following the length field 414. The application link has a value indicating a link such as "com.sec.smarttv.remotecon".

Figure 5:
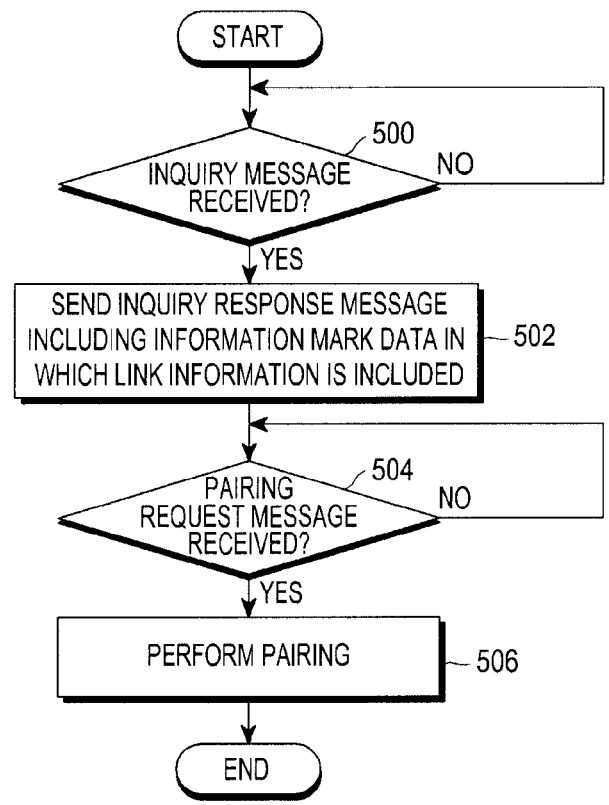
FIG. 5 is a processing flowchart of a Bluetooth headset according to an embodiment of the present disclosure.

FIG. 5 is a processing flowchart of the Bluetooth headset 100 according to an embodiment of the present disclosure. The processing flowchart is executed when the Bluetooth headset 100 of FIG. 1 receives an inquiry message from another, search-attempting Bluetooth device such as the Bluetooth mobile terminal 600. In step 500, if receiving an inquiry message from the search-attempting Bluetooth device through the Bluetooth unit 106, the controller 102 sends an inquiry response message (step 502) to the mobile terminal 600 through the Bluetooth unit 106. This response message has an EIR 300, which includes information mark data 308 including link information as EIR data. If receiving a pairing request message from the Bluetooth mobile terminal 600 through the Bluetooth unit 106 in step 504, the controller 102 performs pairing with the Bluetooth mobile terminal 600 through the Bluetooth unit 106 in step 506.

Figure 6:
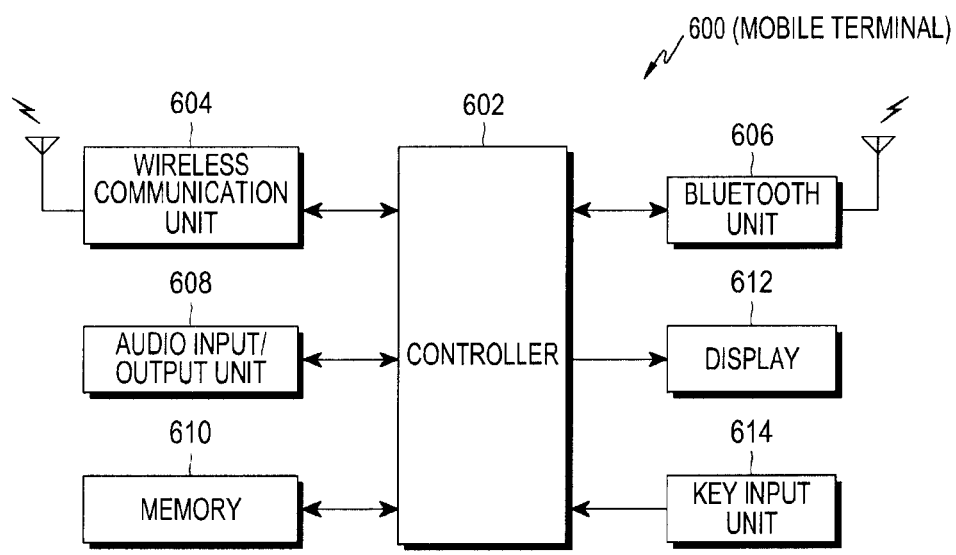
FIG. 6 is a block diagram illustrating a Bluetooth mobile terminal according to an embodiment of the present disclosure.

FIG. 6 is a block diagram illustrating the Bluetooth mobile terminal 600, which is an example of a first Bluetooth device ("first electronic device") according to an embodiment of the present disclosure. As illustrated, the Bluetooth mobile terminal 600 includes a controller 602, a wireless communication unit 604, a Bluetooth unit 606, an audio input/output unit 608, a memory 610, a display 612, and a key input unit 614.

The wireless communication unit 604 transmits and receives a wireless signal for a mobile communication function of the Bluetooth mobile terminal 600 with a mobile communication network. The Bluetooth unit 606 performs Bluetooth communication with another Bluetooth device such as the above-described Bluetooth headset 100. The audio input/output unit 608 includes an audio output device such as a speaker and an audio input device such as a microphone, and inputs and outputs various audio according to operations of the Bluetooth mobile terminal 600. The memory 610 stores a program for the operations of the controller 602, and stores various data according to the operations of the controller 602. The memory 610 may further include an external memory and a storage device such as a Hard Disk Drive (HDD). The display 612 displays an image according to the operations of the controller 602. The key input unit 614 provides various key inputs from the user, which are necessary for the operations of the Bluetooth mobile terminal 600, to the controller 602. The key input unit 614 may include a touch screen panel installed on the display 612, and may include keys for inputting numeric and character information and function keys for setting various functions. The controller 602 controls the wireless communication unit 604, the Bluetooth unit 606, the audio input/output unit 608, the memory 610, the display 612, and the key input unit 614 for functions of the Bluetooth mobile terminal 600.

If there is a Bluetooth device search input from the user through the key input unit 614, the controller 602 sends an inquiry message through the Bluetooth unit 606. If an inquiry response message is received that includes the information mark data 308 from another ("target") Bluetooth device through the Bluetooth unit 606, then the controller 602 extracts link information from this response message. The link information contains a link, e.g., a web address, to associated information of the target Bluetooth device. Controller 602 stores the extracted link information as device information regarding the target Bluetooth device in the memory 610. In the description of the present disclosure, as described above, the Bluetooth headset 100, which is a slave device that sends the inquiry response message, is the target Bluetooth device. Therefore, the controller 602 extracts the link information regarding the associated information of the Bluetooth headset 100, that is, the manual link and/or the application link, from the information mark data 308, and stores the extracted link information in the memory 610 as the device information regarding the Bluetooth headset 100. Thereafter, the controller 602 performs pairing with the Bluetooth headset 100 through the Bluetooth unit 606.

After the manual link and the application link stored as the device information regarding the Bluetooth headset 100 are paired with the Bluetooth headset 100, the manual link and the application link are used to obtain and display the manual associated with the Bluetooth headset 100 and to download the application associated with the Bluetooth headset 100.

Figure 7:
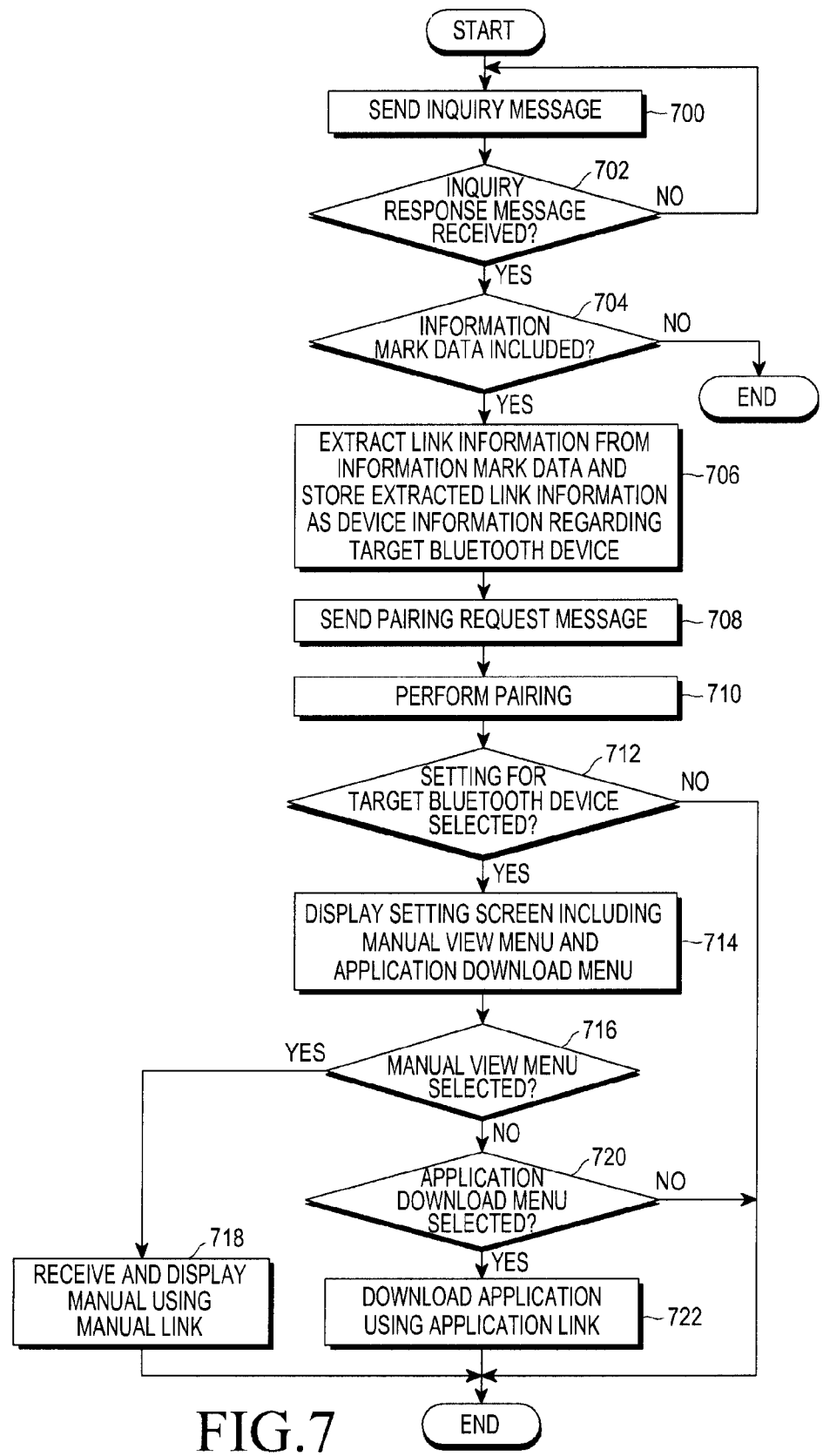
FIG. 7 is a processing flowchart of a Bluetooth mobile terminal according to an embodiment of the present disclosure.

FIG. 7 is a processing flowchart of the Bluetooth mobile terminal 600 according to an embodiment of the present disclosure. The processing flowchart illustrated in FIG. 7 is executed when there is a Bluetooth device search input to the Bluetooth mobile terminal 600 illustrated in FIG. 6 from the user. In steps 700 and 702, the controller 602 searches for a Bluetooth device through the Bluetooth unit 606. The controller 602 sends an inquiry message and determines whether an inquiry response message is received from another Bluetooth device through the Bluetooth unit 606. Such Bluetooth device search may be performed for a predetermined search time, as is conventional.

Next, when an inquiry response message is received, the controller 602 determines whether the information mark data 308 is included in the received inquiry response message (step 704). If the inquiry response message is received from the Bluetooth headset 100 as described above, the information mark data 308 is included in the inquiry response message, and the flow proceeds to 706. On the other hand, if the information mark data 308 is not included in the inquiry response message, the controller 602 terminates processing of FIG. 7 and performs a general pairing procedure.

In step 706, the controller 602 extracts link information regarding associated information of the Bluetooth headset 100 which sends the inquiry response message including the information mark data 308, that is, a manual link and an application link, from the information mark data 308, and stores the extracted manual link and application link as device information regarding the Bluetooth headset 100 in the memory 610. The controller 602 sends a pairing request message to the Bluetooth headset 100 through the Bluetooth unit 606 in step 708, and performs pairing with the Bluetooth headset 100 through the Bluetooth unit 606 in step 710. As in a conventional pairing procedure, the user may confirm that the Bluetooth headset 100 is paired with the Bluetooth mobile terminal 600, through a search screen which shows a Bluetooth search status of the Bluetooth mobile terminal 600.

Figure 8A:
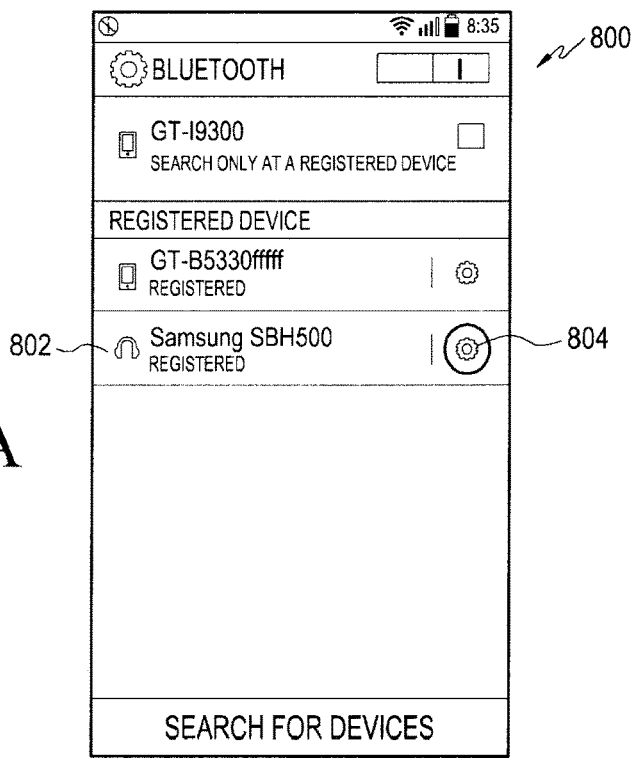
FIG. 8A is a diagram illustrating a search screen of a Bluetooth mobile terminal according to an embodiment of the present disclosure.
Figure 8B:
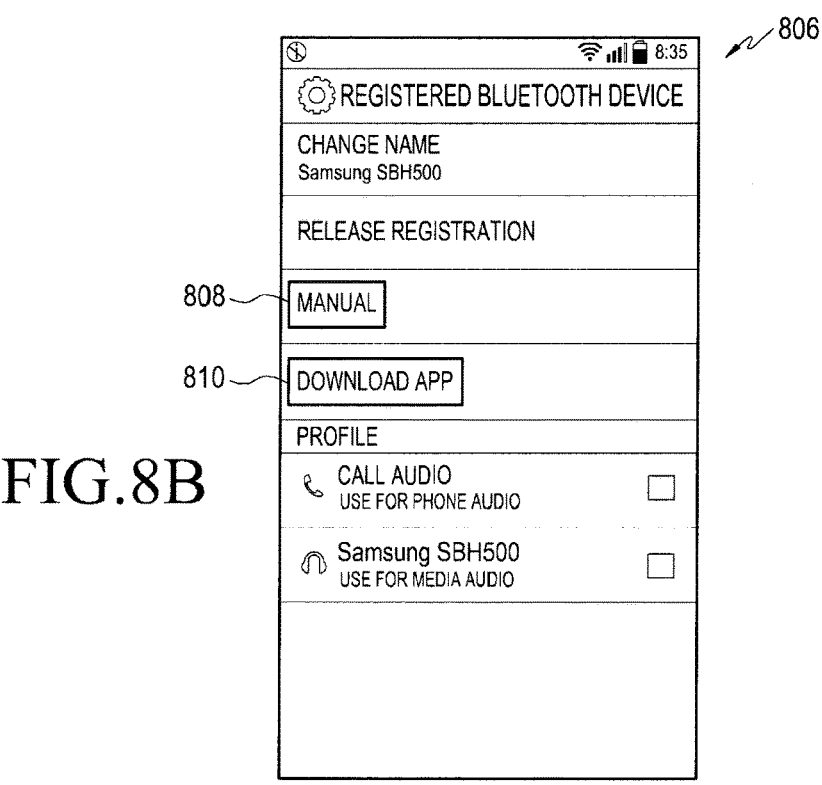
FIG. 8B is a diagram illustrating a setting screen of a Bluetooth mobile terminal according to an embodiment of the present disclosure.

Referring temporarily to FIGS. 8A and 8B, FIG. 8A is a diagram illustrating a search screen 800 of the Bluetooth mobile terminal 600 according to an embodiment of the present disclosure. Search screen 800 is displayed through the display 612 of the Bluetooth mobile terminal 600. In the example, it can be seen that two Bluetooth devices having device names "GT-B5330ffff" and "Samsung SBH500" (also designated with legend 802), respectively, are paired and registered with the Bluetooth mobile terminal 600. The name "Samsung SBH500" is that of the Bluetooth headset 100. In association with each device name, setting icon 804 is provided for confirming or changing a setting state of a corresponding Bluetooth device is displayed, as in a conventional case. For example, the user may select setting for the Bluetooth headset 100 by using the setting icon 804 displayed in the same row as the Bluetooth headset 100. According to an embodiment of the present disclosure, the user may view a manual and/or download an application through a setting screen for a particular Bluetooth device.

FIG. 8B is a diagram illustrating a setting screen 806 of the Bluetooth mobile terminal 600 according to an embodiment of the present disclosure. The setting screen 806 includes a manual view menu 808 represented by a selectable icon labeled "Manual" and an application download menu 810 represented by a selectable icon labeled "Download App". The user may select the manual view menu 808 to view a manual associated with the Bluetooth headset 100 or may select the application download menu 810 to download an application associated with the Bluetooth headset 100.

Referring back to FIG. 7, after pairing with the Bluetooth headset 100 in step 710, the controller 602 determines whether the user selects setting for the Bluetooth headset 100 in step 712. If setting is not selected, the controller 602 terminates processing of FIG. 7.

If setting is selected, in step 714, the controller 602 displays the setting screen 806 including the manual view menu 808 and the application download menu 810 as illustrated in FIG. 8B through the display 612. The controller 602 determines whether the user selects the manual view menu 808 in step 716 and determines whether the user selects the application download menu 810 in step 720. If the user does not select either the manual view menu 808 or the application download menu 810, the controller 602 terminates processing of FIG. 7.

If the user selects the manual view menu 808 through the key input unit 614 in step 716, the controller 602 performs step 718 in response to the selection. In step 718, the controller 602 accesses a network through the wireless communication unit 604 by using a manual link stored in the memory 610 to receive a manual associated with the Bluetooth headset 100 and display the received manual through the display 612. For instance, in one embodiment, the manual is automatically retrieved from a web site corresponding to the manual link address, by means of suitable software executed by controller 602. In another embodiment, selection of a manual link icon may result in a web browser accessing a web page storing the manual, and the web page is displayed on the mobile terminal 600 display screen.

If the user selects the application download menu 810 through the key input unit 614 in step 720, the controller 602 performs step 722 in response to the selection. In step 722, the controller 602 accesses the network through the wireless communication unit 604 by using an application link stored in the memory 610 to download an application associated with the Bluetooth headset 100.

Therefore, when the user desires to pair the Bluetooth headset 100 with the Bluetooth mobile terminal 600, associated information such as the manual or the application associated with the Bluetooth headset 100 is automatically provided to the Bluetooth mobile terminal 600 from the Bluetooth headset 100. Thus, the user may be conveniently provided with the associated information. Moreover, the user may easily view the manual necessary for using the Bluetooth headset 100 merely by selecting the manual view menu 808 on the setting screen 806 for the Bluetooth headset 100. Furthermore, the user may easily download the application necessary or useful for using the Bluetooth headset 100 merely by selecting the application download menu 810 on the setting screen 806 for the Bluetooth headset 100.

In an embodiment variation, Bluetooth mobile terminal 600 stores application links and corresponding package names for the applications in advance. Such advance storage may be implemented by a manufacturer of the Bluetooth mobile terminal 600 or a common carrier. In this case, the Bluetooth headset 100 sends an inquiry response message including the application package name, instead of the application link, in the information mark data 308 to the Bluetooth mobile terminal 600. Then, the Bluetooth mobile terminal 600 may download the application associated with the Bluetooth headset 100 by using the application link stored corresponding to the application package name received from the Bluetooth headset 100. The application package name may be represented by data of a smaller amount than that of the application link. Hence, if the Bluetooth headset 100 sends the application package name, instead of the application link, to the Bluetooth mobile terminal 600, the amount of data transmitted and received and processed may be reduced.

Figure 9:
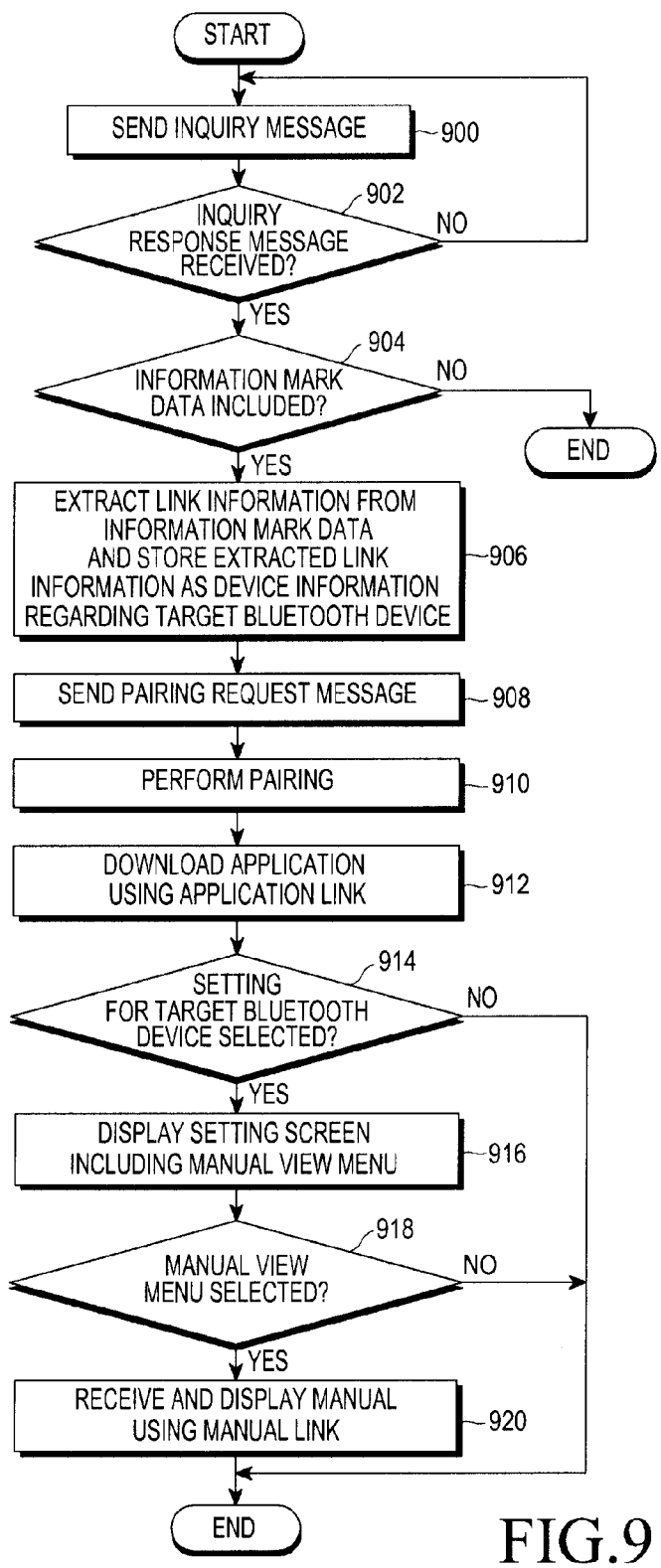
FIG. 9 is a processing flowchart of a Bluetooth mobile terminal according to another embodiment of the present disclosure.

FIG. 9 is a processing flowchart of the Bluetooth mobile terminal 600 according to another embodiment of the present disclosure. The processing flowchart of FIG. 9 is executed when there is a Bluetooth device search input to the Bluetooth mobile terminal 600 of FIG. 6 from the user. In FIG. 9, steps 900 through 910 are substantially the same as steps 700 through 710 of FIG. 7 and thus will not be repetitively described.

After pairing with the Bluetooth headset 100 in step 910, the controller 602 automatically accesses a network through the wireless communication unit 604 by using an application link stored in the memory 610 to download an application associated with the Bluetooth headset 100 (step 912). Next, the controller 602 determines whether the user selects setting for the Bluetooth headset 100 (step 914). If so, the controller 602 executes step 916; if not, processing of FIG. 9 is terminated.

The controller 602 displays a setting screen including a manual view menu through the display 612 in step 916, and determines whether the user selects the manual view menu 808 in step 918. The displayed setting screen does not include the application download menu 810, unlike the scenario in FIG. 8B. This is because the application has already been downloaded automatically in step 912, such that the user does not need to separately manipulate the Bluetooth mobile terminal 600. If the user does not select the manual view menu 808, the controller 602 terminates processing of FIG. 9.

If the user selects the manual view menu 808 through the key input unit 614 in step 918, the controller 602 executes step 920 in response to the selection. In step 920, the controller 602 accesses the network through the wireless communication unit 604 by using a manual link stored in the memory 610 to receive a manual associated with the Bluetooth headset 100 and display the received manual through the display 612.

Therefore, if the link information transmitted from the Bluetooth headset 100 includes the application link, the application associated with the Bluetooth headset 100 is automatically downloaded without the user separately manipulating the Bluetooth mobile terminal 600.

If the method for providing information associated with the Bluetooth device according to embodiments of the present disclosure as described above is applied to a Bluetooth mobile device, the Bluetooth mobile device downloads or installs and executes a program (i.e., an application) for providing the information associated with the Bluetooth device from a program providing device. The program providing device may be e.g., a server located in a remote place. That is, once the program for providing the information associated with the Bluetooth device is installed in the Bluetooth mobile device, the program is executed in the Bluetooth mobile device to provide the information associated with the Bluetooth device. The program providing device transmits the program to the Bluetooth mobile device in response to a transmit request for the program from the Bluetooth mobile device, or the program is transmitted automatically. The program providing device may additionally perform service subscription determination, user authentication, and payment information checking with respect to the Bluetooth mobile device. The program providing device may include a communication unit for performing wired or wireless communication with the Bluetooth mobile device, a storage medium for storing the program, and a controller for transmitting the program to the Bluetooth mobile device through the communication unit. The storage medium may be located inside or outside the program providing device.

Embodiments of the present disclosure as described above can be implemented with hardware, software, or a combination of hardware and software. Such arbitrary software may be stored, whether or not erasable or re-recordable, in a volatile or non-volatile storage such as a Read-Only Memory (ROM); a memory such as a Random Access Memory (RAM), a memory chip, a device, or an integrated circuit; and an optically or magnetically recordable and machine (e.g., computer)-readable storage medium such as a Compact Disc (CD), a Digital Versatile Disk (DVD), a magnetic disk, or a magnetic tape. Therefore, the present disclosure includes a program including codes for implementing an apparatus or method claimed in an arbitrary claim and a machine-readable storage medium for storing such a program. The program may be electronically transferred through an arbitrary medium, e.g. in the form of a communication signal delivered through wired or wireless connection, and the present disclosure properly includes equivalents thereof.

According to the embodiments of the present disclosure, the search-attempting Bluetooth device receives link information regarding associated information of a target Bluetooth device from the target Bluetooth device and provides the link information to the user. The link information may be provided in the form of an icon or hyperlink allowing for easy selection and retrieval of the associated information. Thus, if the link information is a manual link associated with the target Bluetooth device, the user may easily obtain the manual via selection of an icon or hyperlink for the manual, and view the manual on the search-attempting Bluetooth device display. If the link information is an application link associated with the target Bluetooth device, the user may easily download an application necessary or useful for the target Bluetooth device.

According to the embodiments of the present disclosure, if the link information regarding the associated information of the target Bluetooth device from the target Bluetooth device is the application link associated with the target Bluetooth device, the search-attempting Bluetooth device may automatically download the application associated with the target Bluetooth device by using the application link. Hence, the user may not need to manually search for and download the application necessary for using the target Bluetooth device.

While the exemplary embodiments described herein have been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method in a first Bluetooth device, the method comprising:
    storing a plurality of package names of applications and a corresponding plurality of application web addresses in a memory;
    sending an inquiry message for searching for a Bluetooth device;
    receiving from a plurality of Bluetooth devices, a corresponding plurality of inquiry response messages including predefined information mark data, and wherein the predefined information mark data of each of the plurality of inquiry response messages include a web address and a package name of an application;
    displaying indicators for each of the plurality of Bluetooth devices; and
    responsive to selection of one of the indicators:
        pairing with a particular one of the plurality of the Bluetooth devices that the selected indicator was for, thereby resulting in a paired Bluetooth device;
        displaying an object, wherein selection of the object causes accessing the web address from an inquiry response message corresponding to the paired Bluetooth device;
        extracting the package name of the application from the predefined information mark data from the inquiry response message from the paired Bluetooth device;
        determining which one of the plurality of application web addresses corresponds to the package name of the application through a local search in the memory, thereby resulting in an application web address; and
        downloading an application from the application web address.

2. The method of claim 1, wherein the predefined information mark data of each of the plurality of Bluetooth devices includes another web address, and
    wherein responsive to selection of one of the indicators, the method further comprises:
        displaying another object, wherein selection of the another object causes accessing the another web address from the inquiry response message corresponding to the paired Bluetooth device.

3. The method of claim 2, wherein the predefined information mark data of each of the plurality of Bluetooth devices includes another web address, and the method further comprises:
    automatically downloading an application by accessing the another web address from the inquiry response message corresponding to the paired Bluetooth device, responsive to pairing.

4. The method of claim 1, wherein the predefined information mark data is included as Extended Inquiry Response (EIR) data in each of the plurality of the inquiry response messages.

5. A first Bluetooth device comprising:
    a Bluetooth unit to perform Bluetooth communication with another Bluetooth device; and
    a controller configured to:
        store a plurality of package names of applications and a corresponding plurality of application web addresses in a memory;
        send, via the Bluetooth unit, an inquiry message for searching for a Bluetooth device,
        receive a plurality of inquiry response messages via the Bluetooth unit from a plurality of Bluetooth devices, each of the plurality of inquiry response messages including predefined information mark data, and wherein the predefined information mark data of each inquiry response message includes a web address and a package name of an application,
        display indicators for each of the plurality of Bluetooth devices on a display, and
        responsive to selection of one of the indicators:
            pairing with a particular one of the plurality of the Bluetooth devices that the selected indicator was for, thereby resulting in a paired Bluetooth device, using the Bluetooth unit;
            displaying an object on the display, wherein selection of the object causes a communication unit to access the web address from an inquiry response message corresponding to the paired Bluetooth device;
            extracting the package name of the application from the predefined information mark data from the inquiry response message from the paired Bluetooth device;
            determining which one of the plurality of web addresses corresponds to the package name of the application through a local search in the memory, thereby resulting in an application web address; and
            downloading an application from the application web address.

6. The first Bluetooth device of claim 5, wherein the predefined information mark data of each of the plurality of Bluetooth devices includes another web address, and wherein responsive to selection of one of the indicators, the controller is further configured to:
   display another object on the display, wherein selection of the another object causes the communication unit to access the another web address from the inquiry response message corresponding to the paired Bluetooth device.

7. The first Bluetooth device of claim 6, wherein the controller downloads an application by accessing another web address from the inquiry response message of the paired Bluetooth device, responsive to pairing.

8. The first Bluetooth device of claim 5, wherein the predefined information mark data is included as Extended Inquiry Response (EIR) data in each of the plurality of the inquiry response messages.

9. A first Bluetooth device comprising:
   a Bluetooth unit to perform Bluetooth communication with another Bluetooth device; and
   a controller configured to:
      store a plurality of package names of applications and a corresponding plurality of application web addresses in a memory;
      send, via the Bluetooth unit, an inquiry message for searching for a Bluetooth device,
      receive a plurality of inquiry response messages via the Bluetooth unit from a plurality of Bluetooth devices, each of the plurality of inquiry response messages including a package name of an application,
      display indicators for each of the plurality of Bluetooth devices on a display, and
      responsive to selection of one of the indicators:
         pairing with a particular one of the plurality of the Bluetooth devices that the selected indicator was for, thereby resulting in a paired Bluetooth device, using the Bluetooth unit;
         determining which one of the plurality of application web addresses corresponds to the package name of the application from the inquiry response message from the paired Bluetooth device through a local search in the memory, thereby resulting in an application web address; and
         downloading an application from the application web address.

* * * * *